United States Patent [19]

Federn

[11] Patent Number: 4,661,084

[45] Date of Patent: Apr. 28, 1987

[54] SHAFT COUPLING WHICH IS TORSIONALLY STIFF, YET CAPABLE OF BEING ELASTICALLY BENT

[76] Inventor: Klaus Federn, Dachsberg 14, 1000 Berlin 33, Fed. Rep. of Germany

[21] Appl. No.: 732,459

[22] Filed: May 9, 1985

[30] Foreign Application Priority Data

May 14, 1984 [DE] Fed. Rep. of Germany ....... 3417802

[51] Int. Cl.$^4$ ............................................. F16D 3/64
[52] U.S. Cl. ..................................... 464/69; 464/100
[58] Field of Search ................. 464/69, 81, 84, 93, 464/94, 95, 96, 98, 99, 100, 101, 137, 147

[56] References Cited

U.S. PATENT DOCUMENTS

| | | | |
|---|---|---|---|
| 1,025,875 | 5/1912 | Lambert | 464/69 |
| 2,431,409 | 11/1947 | Mart | 464/69 |
| 3,668,891 | 6/1972 | Brizzolesi | 464/69 |
| 4,073,161 | 2/1978 | Bury | 464/99 |

FOREIGN PATENT DOCUMENTS

| | | | |
|---|---|---|---|
| 1041309 | 10/1958 | Fed. Rep. of Germany | 464/69 |
| 2056184 | 7/1972 | Fed. Rep. of Germany | |
| 2100052 | 7/1975 | Fed. Rep. of Germany | |
| 2725289 | 12/1978 | Fed. Rep. of Germany | 464/69 |
| 204522 | 11/1983 | German Democratic Rep. | |
| 281281 | 8/1934 | Italy | 464/94 |
| 170073 | 10/1921 | United Kingdom | 464/95 |

Primary Examiner—Daniel P. Stodola
Attorney, Agent, or Firm—Jeffers, Irish & Hoffman

[57] ABSTRACT

A shaft coupling which is torsionally stiff yet capable of being elastically bent having guides arranged between two coupling halves at right angles to the axis of rotation in the form of thin-walled plates. Their overlapping end sections assigned to one another being alternately fixed to the coupling halves between tightening washers. So as to reduce its stiffness under flexure, the front side nearest the plate of one tightening washer supported against the corresponding coupling half has a middle section running radially and intersecting the extended axis of rotation at least more or less obliquely, which passes over on both sides into flat zones extending at right angles to the axis of rotation, so that the middle planes of the plates running on both sides of the tightening washer lie in a common plane. The front side of the other tightening washer turned toward the said one tightening washer is, taking into consideration the plates to be tightened, formed equidistant at least in the region of the flat zones extending at right angles to the axis of rotation. The end sections of the plates are cranked according to the shape of the front sides of the tightening washers.

5 Claims, 6 Drawing Figures

SHAFT COUPLING WHICH IS TORSIONALLY STIFF, YET CAPABLE OF BEING ELASTICALLY BENT

BACKGROUND OF THE INVENTION

The invention relates to a shaft coupling of the type which is torsionally stiff, yet can be elastically bent, and which comprises guides, arranged between two coupling halves, at right angles to the axis of rotation, in the form of thin-walled plates, whose overlapping end sections assigned to one another are alternately fixed to the coupling halves between tightening washers by screw connectors.

Such a coupling is known from German Auslegeschrift No. 21 00 052. There the overlapping plates are formed flat so that the plates extending from a common clamping device to various sides run in different planes. With a cranked coupling joint, this arrangement of plates results in forces of reaction which increase the bending resistance of the coupling. Furthermore, since more stresses occur in the plates than would occur with a coupling having a flat annular disk of corresponding dimensions, the area of application of the known coupling is restricted.

These problems do not occur with shaft couplings in which the two coupling halves are connected by an annular disk moving at right angles to the axis of rotation, as this extends in one plane. The problems are also avoided in such couplings where plates whose adjacent end sections are held on adjacent bolts of one coupling half without overlapping one another are used (German Offenlegunsschrift No. 20 56 184). Certainly, the shortened elongation length of the plates caused by this results in increased rigidity of the coupling.

SUMMARY OF THE INVENTION

The object of the invention is to create a torsionally stiff shaft coupling with a slight bending resistance which is distinguished by simple design and inexpensive manufacture.

According to this invention, such a shaft coupling comprises guides, arranged between two coupling halves, at right angles to the axis of rotation, in the form of thin-walled plates whose overlapping end sections assigned to one another are alternately fixed to the coupling halves between tightening washers by screw connections. The front side nearest the plate of one tightening washer supported against the corresponding coupling half has a middle section running radially and intersecting the extended axis of rotation at least more or less obliquely, which passes over on both sides into flat zones extending at right angles to the axis of rotation, so that the middle planes of the plates running on both sides of the tightening washer lie in a common plane. The front side of the other tightening washer turned towards the mentioned tightening washer is, taking into consideration the plates to be tightened, formed equidistant at least in the region of the flat zones extending at right angles to the axis of rotation. The end sections of the plates are cranked according to the shape of the front sides of the tightening washers.

The invention has the advantage that, in spite of the use by plates overlapping one another at the ends, the shaft coupling acts like such a coupling having an annular disk. By the aligning path of the plates the resultant stresses and forces of reaction are consequently no greater than with a coupling having an annular disk. Moreover, relatively large shaft couplings can be realized, as the manufacture of the required plate sizes, but not on the other hand the manufacture of correspondingly large annular disks, permits the dimensions of spring plates which can be supplied inexpensively. Finally, with the manufacture of plates high waste of material is avoided as with the manufacture of annular disks.

The plates are of a length corresponding to the multiple distance between two adjacent screw connections and mutually overlap so as to enable the reduction of the cranks of plates at each clamping device in relation to that required with plates which only span the distance between two adjacent screw connections.

The tightening washers are positioned so as to overlie one another with the plates inserted between them and the washers are non-rotatably held in relation to the corresponding plates. The purpose of holding together and fixing the plates and tightening washers during pre-assembly is to mount, and if necessary, to exchange this structural unit forming a closed ring subsequently on the coupling halves with a few handles.

The above-mentioned and other features and objects of this invention and the manner of attaining them will become more apparent and the invention itself will be best understood by reference to the following description of an embodiment of the invention taken in conjunction with the accompanying drawings.

DETAILED DESCRIPTION OF SPECIFIC EMBODIMENTS

Figure 1:
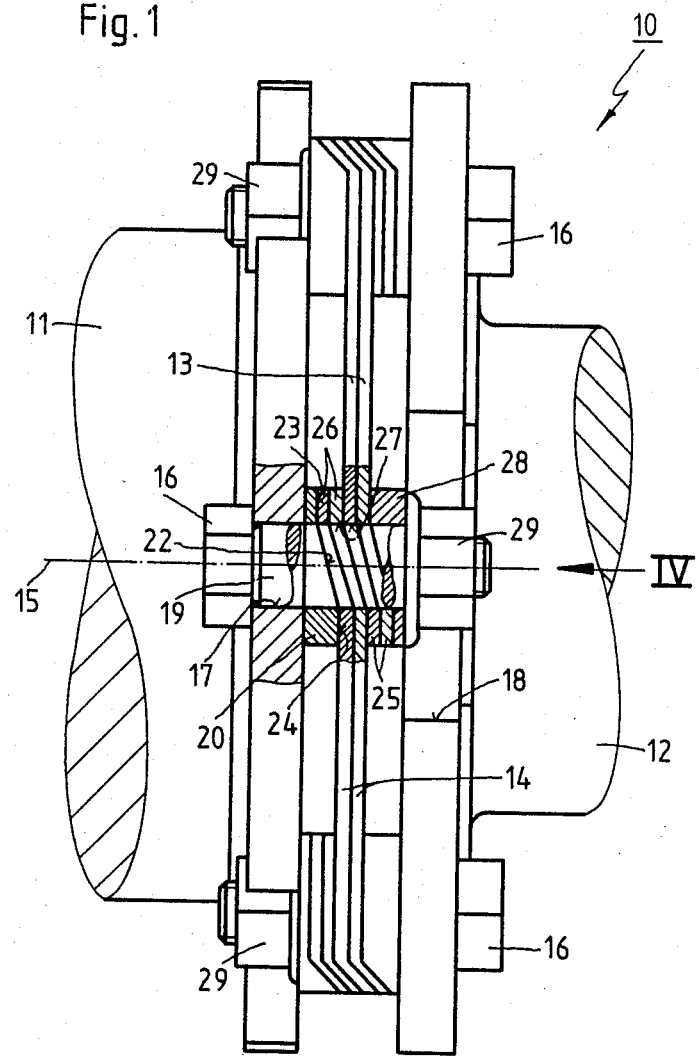
FIG. 1 is a view of a shaft coupling with thin-walled plates overlapping one another at the ends and fixed between tightening washers as the first exemplified embodiment.

Referring to the drawings, a shaft coupling 10, which is stiff against torsion and can be elastically bent, has two coupling halves 11 and 12, in which guides are provided as connecting elements in the form of thin-walled plates 13, 14 (see FIG. 1). The plates 13 and 14 extend into planes running at right angles to the axis of rotation 15 of the coupling 10. On the coupling halves 11 and 12 are arranged six tight-fit screws 16 as carriers for the plates 13 and 14. The tight-fit screws 16 arranged uniformly distributed over a radius are held alternately on the coupling halves 11 and 12 in fitted drill holes 17. In the area of each tight-fit screw 16 is provided a recess 18 in the corresponding coupling half 11 or 12. The fastening of the plates 13 and 14, which occurs in the same way for all tight-fit screws 16, is described hereinafter.

Figure 4:
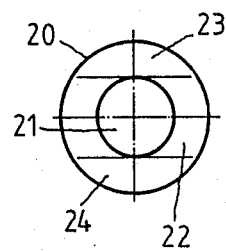
FIG. 4 is a front elevation in the direction of the arrow IV in FIG. 1 seen on the front end of the tightening washer supported against the left coupling half.

On the shank 19 of the tight-fit screw 16 is fitted a tightening washer 20 with a corresponding bore hole 21 (see FIGS. 1 and 4). The tightening washer 20 supported against the coupling half 11 can be non-rotatably held by a dowel pin, not shown. The front side of this tightening washer 20 on the side of the plate and turned away from the coupling half 11 has a middle section 22 running radially and obliquely intersecting the axis of rotation 15 in extension. As FIG. 4 shows, the parallelism of this middle section 22 is limited. From the middle section 22 proceed flat zones 23 and 24 extending at right angles to the axis of rotation 15 with rounded-off transition on both sides. The tightening washer 29 consequently has a distinct axial extension in the area of these flat zones 23 and 24.

Figure 2:
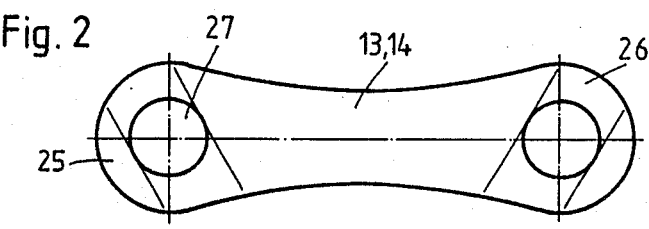
FIG. 2 is a front elevation of such a plate with cranked end sections.
Figure 3:
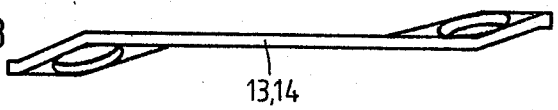
FIG. 3 is a plan view of the narrow side of this plate.

Following the tightening washer 20 the overlapping plates 13 and 14 assigned to one another and having their end sections 25 and 26 cranked in opposite directions corresponding to the shape of the tightening washer are fixed on the shank 19 of the tight-fit screw. For this purpose the plates 13 and 14 are provided with appropriate bore holes 27 on its end sections 25 and 26 (see FIGS. 2 and 3). Finally, on the shank 19 of the tight-fit screw 16 sits a second tightening washer 28, whose front end turned toward the tightening washer 20 is formed equidistant from the washer 20. The tightening washer 28 is also non-rotatably held in relation to the coupling half 11. A nut 29 screwed onto the tight-fit screw 16 tightens the two tightening washers 20 and 28 and the intermediary end sections 25 and 26 of the plates 13 and 14 against the coupling half 11. As FIG. 1 clearly shows, the plates 13 and 14 consecutive in the circumferential direction run in common planes.

Figure 5:
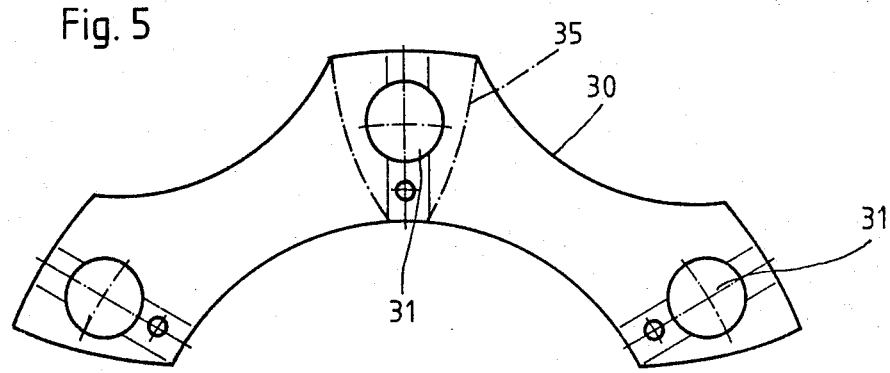
FIG. 5 is a front elevation of a second exemplified embodiment of a cranked plate, which is approximately twice as long as the embodiment according to FIG. 2.
Figure 6:
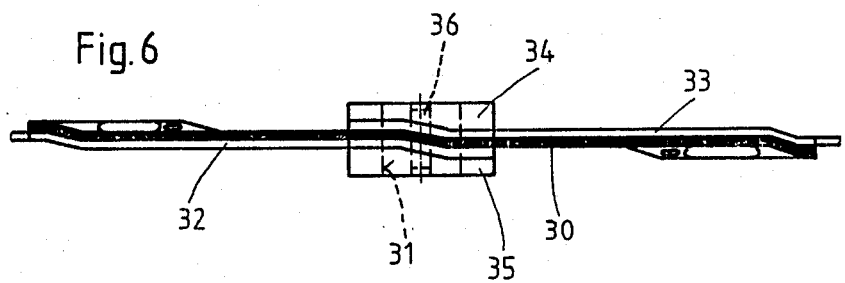
FIG. 6 is a plan view of the plate in accordance with FIG. 5 in association with further such plates and attached tightening washers.

The plate 30 shown in FIG. 5 as the second specific embodiment has approximately twice the length of such a plate in the first specific embodiment. It therefore replaces two plates 13 and 14 consecutive in the circumferential direction and connects three screw connections 16, 29 assigned to these plates. For this purpose, the plate 30 is provided with three fitted bore holes 31. As the part of a link connection represented in FIG. 6 shows, the plate 30, shown with the narrow side shaded for the sake of clarity, is also cranked in the region of each of these bore holes 31. As plates 32 and 33 extending from the middle bore hole 30 to both sides respectively, cover the plate 30 with half its length, the cranking can be less severe than with the first exemplified embodiment. However, the sections of the plates 30 and 32 or 30 and 33, respectively, assigned to one another are in the same planes. In the region of the middle fitted bore holes 31, washers 34 and 35 constructed accordingly are attached to the plates 30, 32 and 33. The outline of these polygon-shaped tightening washers is shown in FIG. 5 by dot-dash lines. In the region of each fitted bore hole 31 are positioned the two tightening washers 34 and 35 and the plates 30, 32 and 33 inserted between them by a pin 36 running parallel to the bore hole.

While there have been described above the principles of this invention in connection with specific apparatus, it is to be clearly understood that this description is made only by way of example and not as a limitation to the scope of the invention.

What is claimed is:
1. A shaft coupling having an axis of rotation and being of the type which is torsionally stiff and can be elastically bend, said coupling comprising:
a pair of coupling halves:
a plurality of screw connections arranged circumferentially about said coupling halves with alternating ones of said connections being connected to the same one of said pair of coupling halves.
at least a pair of tightening washers mounted to each of said screw connections; and
a plurality of thin-walled guide plates arranged between said coupling halves at generally right angles to said axis of rotation of said coupling and in a generally circumferential direction relative to said coupling halves, said guide plates each having cranked overlapping opposite end sections being alternately connected to said coupling halves between said pairs of tightening washers by said screw connections, said guide plates each also having a generally planar intermediate section extending at a generally right angle to said axis of rotation and between and interconnecting said opposite end sections thereof and between said pairs of tightening washers, said cranked opposite end sections of each guide plate extending at generally oblique angles to said rotational axis and in opposite directions away from and outside of the plane of said planar intermediate section of said guide plate;
each washer of said pairs of tightening washers having a middle section with a front side facing toward one of said cranked opposite end sections of said plates and extending in a plane intersecting said axis of rotation generally obliquely, said mdidle section extending into opposite end flat zones which extend at generally right angles to said axis of rotation so that said intermediate planar sections of said plates extending away from said opposite ends of said tightening washers lie in a common plane, said tightening washers of each pair thereof also being disposed generally equidistant from one another at least in the region of said flat zones thereof;
said opposite end sections of said plates being cranked in conformity to the shape of said front sides of said middle sections of said tightening washers.
2. A shaft coupling according to claim 1 wherein transitions between said middle section and said adjoining flat zones at the front side of each of said tightening washers which face towards one another are rounded-off.
3. A shaft coupling according to claim 1 wherein each of said plates has a length corresponding to a multiple of at least two times the distance between two adjacent screw connections and mutually overlap by said distance.
4. A shaft coupling according to claim 1 wherein said tightening washers assigned to one another are non-rotatably held in relation to said corresponding plates.
5. A shaft coupling according to claim 1 wherein said tightening washers assigned to one another are positioned so as to overlie one another, portions of said plates inserted between said tightening washers being held therebetween by a fixing element.

* * * * *

UNITED STATES PATENT AND TRADEMARK OFFICE
CERTIFICATE OF CORRECTION

PATENT NO. : 4,661,084

DATED : April 28, 1987

INVENTOR(S) : Klaus Federn

It is certified that error appears in the above-identified patent and that said Letters Patent is hereby corrected as shown below:

```
Col. 3, line 13, change "29" to --20--;
Claim 1, Col. 4, line 4, change "bend" to --bent--;
Claim 1, Col. 4, line 26, delete "generally";
Claim 1, Col. 4, line 34, delete "generally";
Claim 1, Col. 4, line 34, change "mdidle" to --middle--.
```

Signed and Sealed this

Eighteenth Day of August, 1987

*Attest:*

DONALD J. QUIGG

*Attesting Officer*  *Commissioner of Patents and Trademarks*